United States Patent
Boka et al.

(10) Patent No.: US 7,248,206 B1
(45) Date of Patent: Jul. 24, 2007

(54) INSTANTANEOUS MULTISENSOR ANGULAR BIAS AUTOREGISTRATION

(75) Inventors: Jeffrey B. Boka, Lumberton, NJ (US); Peter J. Mavroudakis, Hightstown, NJ (US); Naresh R. Patel, Bellmawr, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 194 days.

(21) Appl. No.: 11/149,692

(22) Filed: Jun. 10, 2005

(51) Int. Cl.
*G01S 13/72* (2006.01)

(52) U.S. Cl. .......................... 342/90; 342/95; 342/97; 342/106; 342/109; 342/113; 342/115; 342/133; 342/140; 342/145; 342/146; 342/189; 342/195; 342/451

(58) Field of Classification Search .............. 342/59, 342/90, 95–97, 106–109, 113, 115, 133, 139, 342/140, 145–147, 159–162, 189, 195, 450, 342/451, 463–465
See application file for complete search history.

(56) References Cited

U.S. PATENT DOCUMENTS

| 4,050,068 | A | * | 9/1977 | Berg et al. ............. 342/53 |
| 5,214,433 | A | * | 5/1993 | Alouani et al. ......... 342/95 |
| 5,451,960 | A | * | 9/1995 | Kastella et al. ........ 342/59 |
| 5,657,251 | A | * | 8/1997 | Fiala .................. 342/162 |
| 5,798,942 | A | * | 8/1998 | Danchick et al. ....... 342/96 |
| 5,808,975 | A | * | 9/1998 | Tani ................... 369/30.15 |
| 5,877,722 | A | * | 3/1999 | Shams ................. 342/147 |
| 5,960,097 | A | * | 9/1999 | Pfeiffer et al. ........ 382/103 |
| 6,225,942 | B1 | * | 5/2001 | Alon ................... 342/59 |
| 6,278,401 | B1 | * | 8/2001 | Wigren ................ 342/195 |
| 6,404,380 | B2 | * | 6/2002 | Poore, Jr. ............. 342/96 |

(Continued)

FOREIGN PATENT DOCUMENTS

DE    3644002 A1 *  6/1988

(Continued)

OTHER PUBLICATIONS

"Ballistic missile track initiation from satellite observations", Yeddanapudi, M.; Bar-Shalom, Y.: Pattipati, K.R.; Deb, S. Aerospace and Electronic Systems, IEEE Transactions on vol. 31, Issue 3, Jul. 1995 Ps:1054-1071.*

(Continued)

*Primary Examiner*—John B Sotomayor
(74) *Attorney, Agent, or Firm*—Duane Morris, LLP

(57) ABSTRACT

Unknown alignment biases of sensors of a tracking system are estimated by an iterative Kalman filter method. Current measurements are corrected for known alignment errors and previously estimated alignment biases. The filter time reference is updated to produce estimated target state derivative vectors. A Jacobian of the state dynamics equation is determined, which provides for observability into the sensor alignment bias through gravitational and coriolis forces. The target state transition matrix and the target error covariance matrix are propagated. When a new measurement becomes available, the Kalman gain matrix is determined, the state vector and covariance measurements are updated, and sensor alignment biases are estimated. The state vector, covariance measurements, and estimated sensor alignment biases are transformed to an estimated stable space frame for use in tracking the target and updating the next iteration.

9 Claims, 6 Drawing Sheets

ISSAC FUNCTIONAL BLOCK DIAGRAM

U.S. PATENT DOCUMENTS

2005/0004759 A1* 1/2005 Siegel .................. 701/223
2006/0082922 A1* 4/2006 Shih .................. 360/78.06

FOREIGN PATENT DOCUMENTS

EP           121804 A2 * 10/1984
JP        2005165517 A  *  6/2005

OTHER PUBLICATIONS

"A strong tracking extended Kalman observer for nonlinear discrete-time systems", Boutayeb, M.; Aubry, D. Automatic Control, IEEE Transactions on vol. 44, Issue 8, Aug. 1999 Ps.:1550-1556.*

"A new method for the nonlinear transformation of means and covariances in filters and estimators", Julier, S.; Uhlmann, J.; Durrant-Whyte, H.F. Automatic Control, IEEE Transactions on vol. 45, Issue 3, Mar. 2000 Ps.:477-482.*

"Recursive filtering approach to MS locating using quantized to a measurements", Enescu, V.; Sahli, H. 3G Mobile Communication Technologies, 2001. Second Int'l Conference on (Conf. Publ. No. 477) Ps:206-210.*

"Derivation and evaluation of improved tracking filter for use in dense multitarget environments", Singer, R.; Sea, R.; Housewright, K. Information Theory, IEEE Transactions on vol. 20, Issue 4, Jul. 1974 Ps: 423-342.*

* cited by examiner

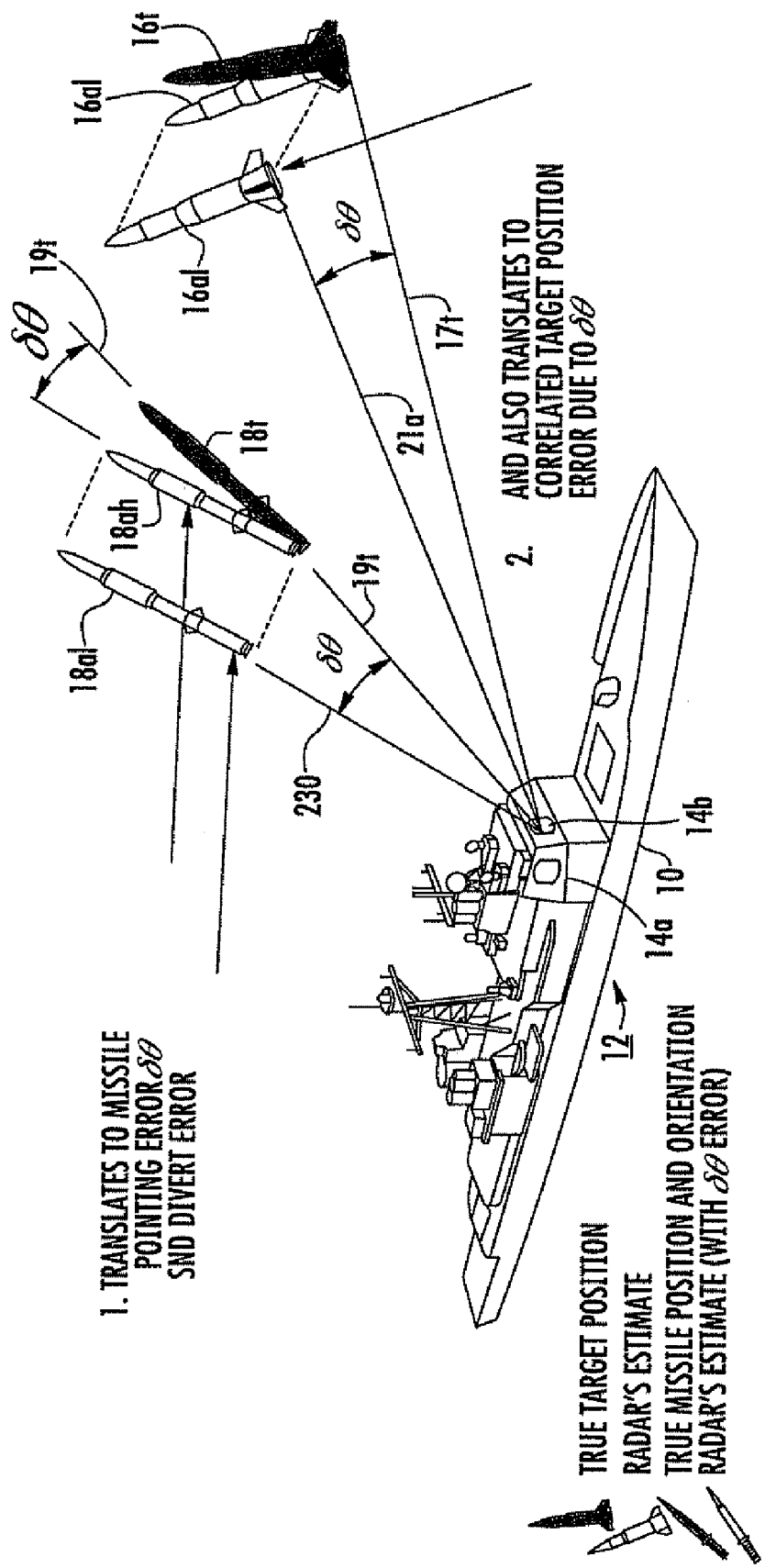
FIG. 1: ERROR IN RADAR FACE ALIGNMENT (PRIOR ART)

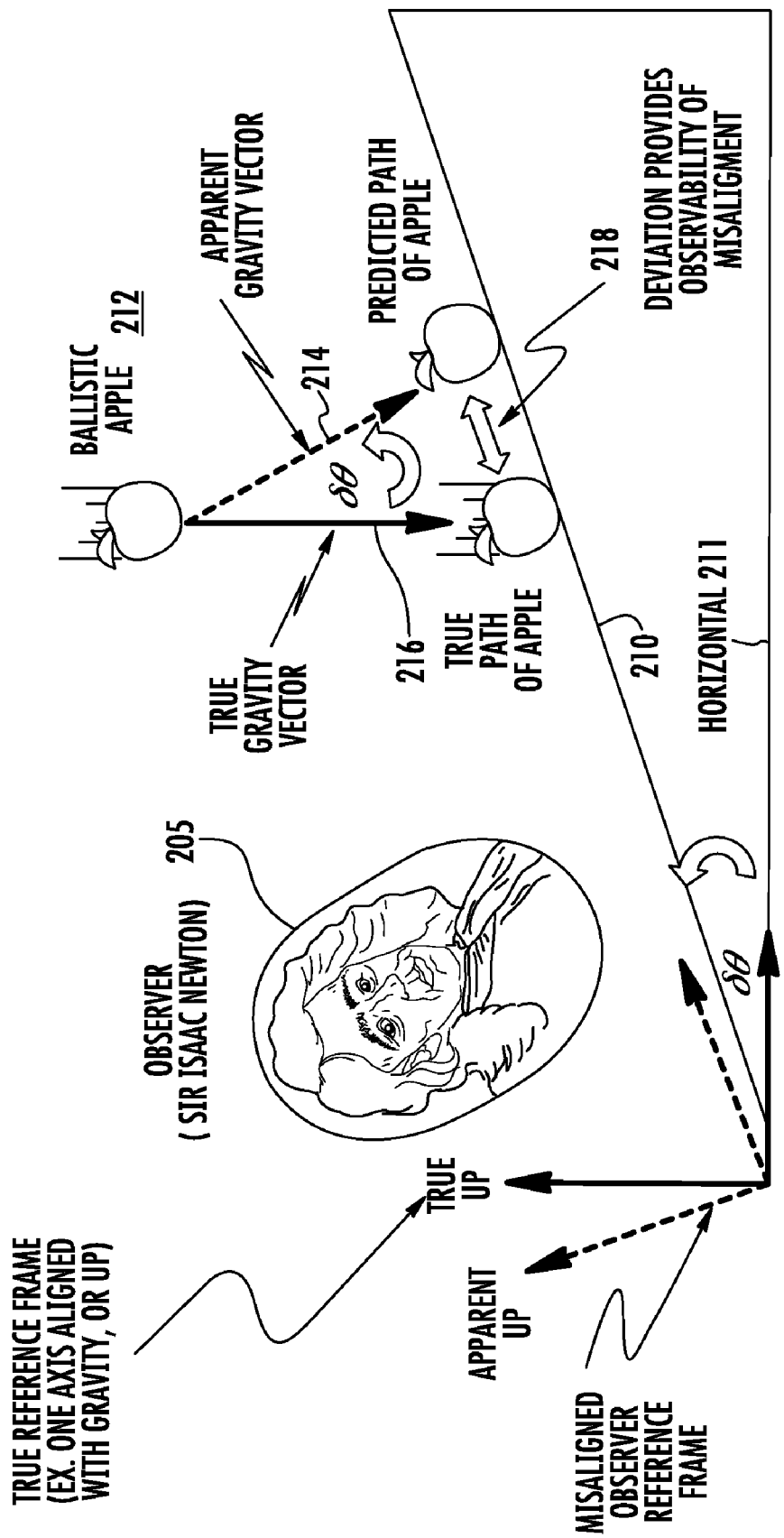
FIG. 2: ISSAC FALLING APPLE PRINCIPLE (PRIOR ART)

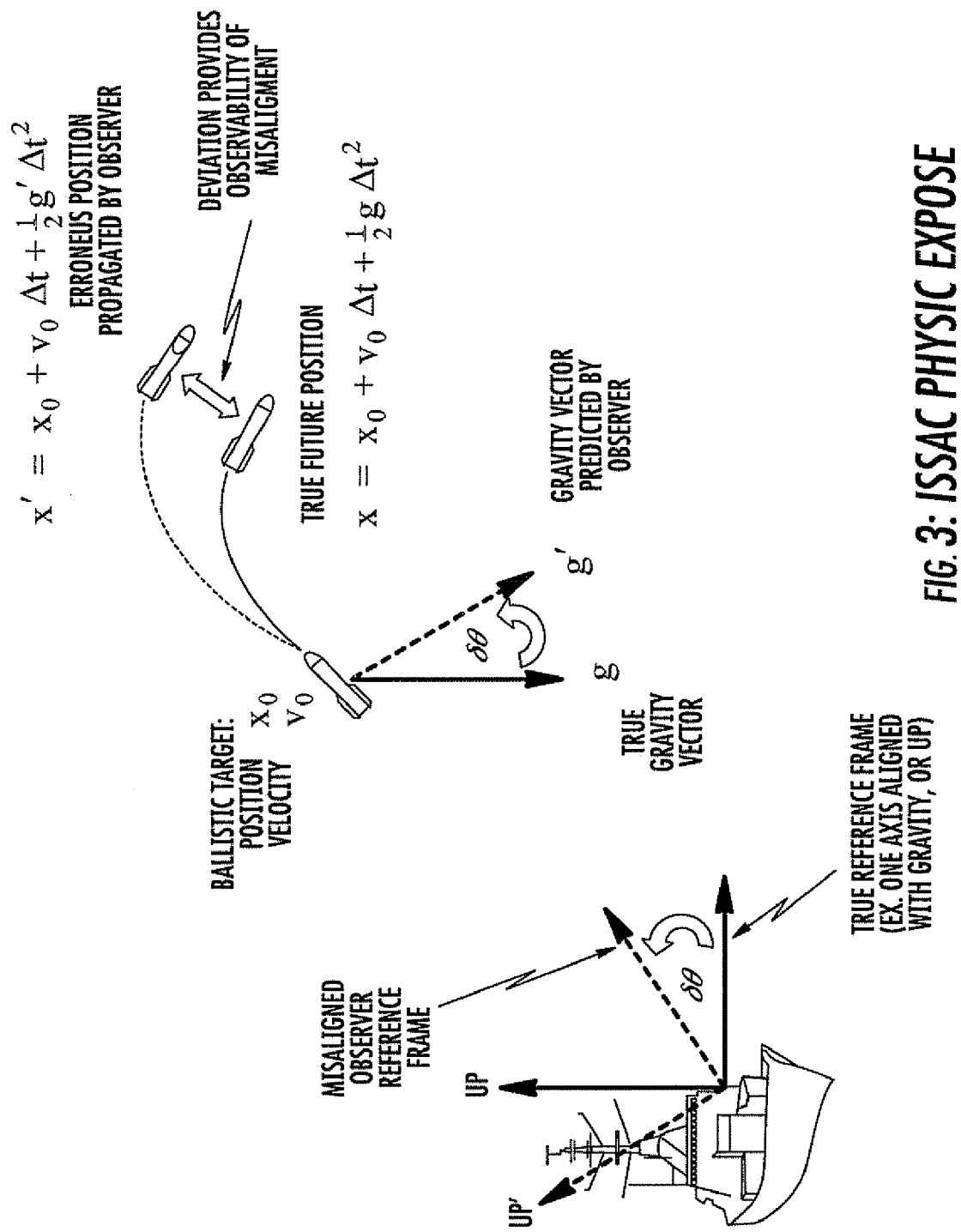
FIG. 3: ISSAC PHYSIC EXPOSE

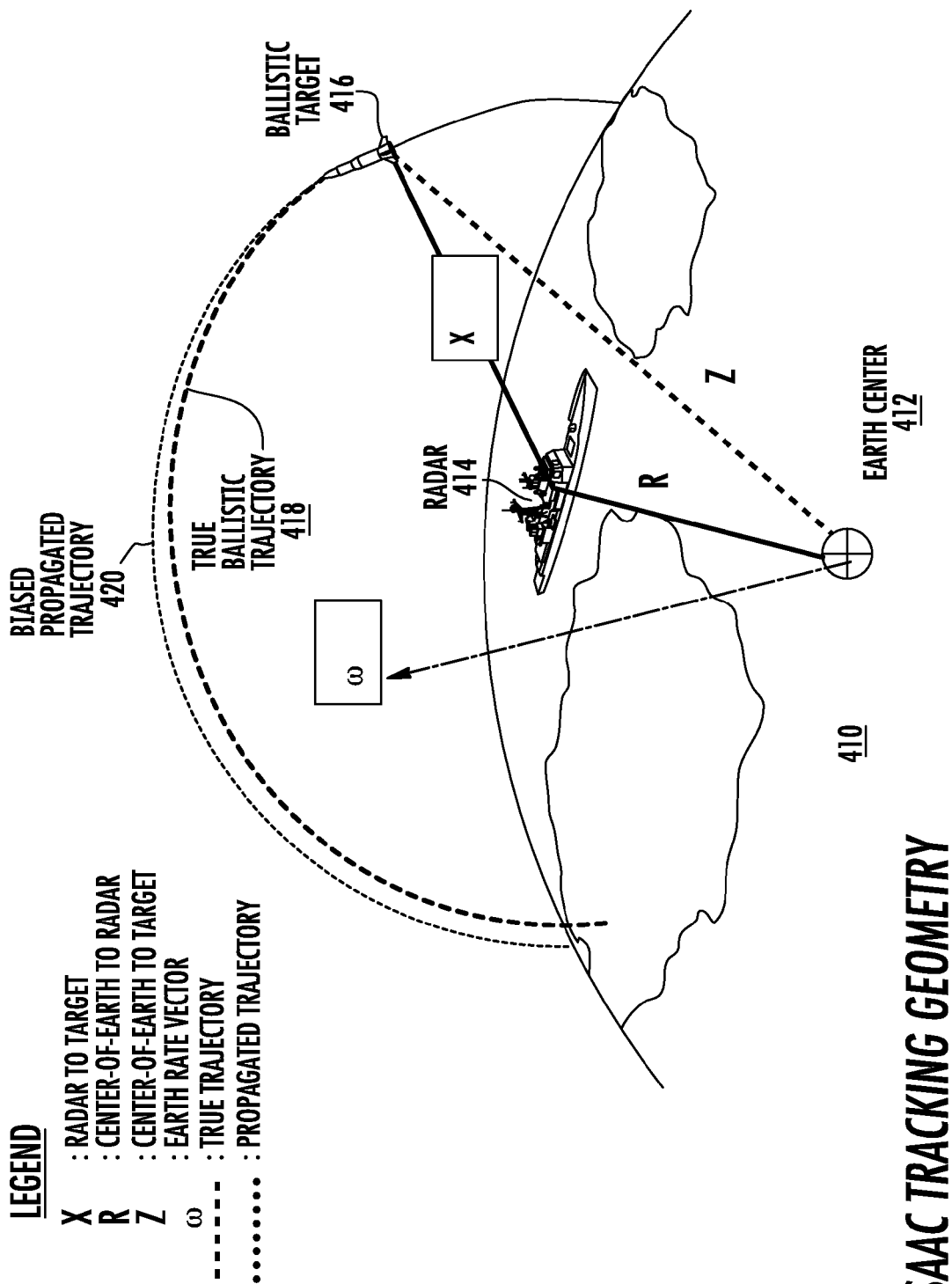
FIG. 4: ISAAC TRACKING GEOMETRY

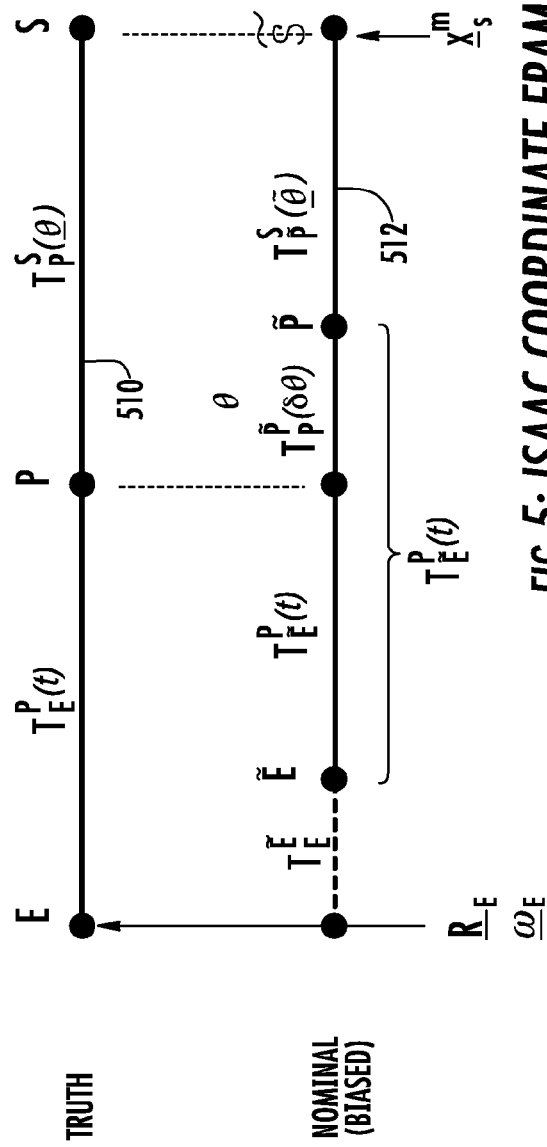
FIG. 5: ISAAC COORDINATE FRAME DIAGRAM

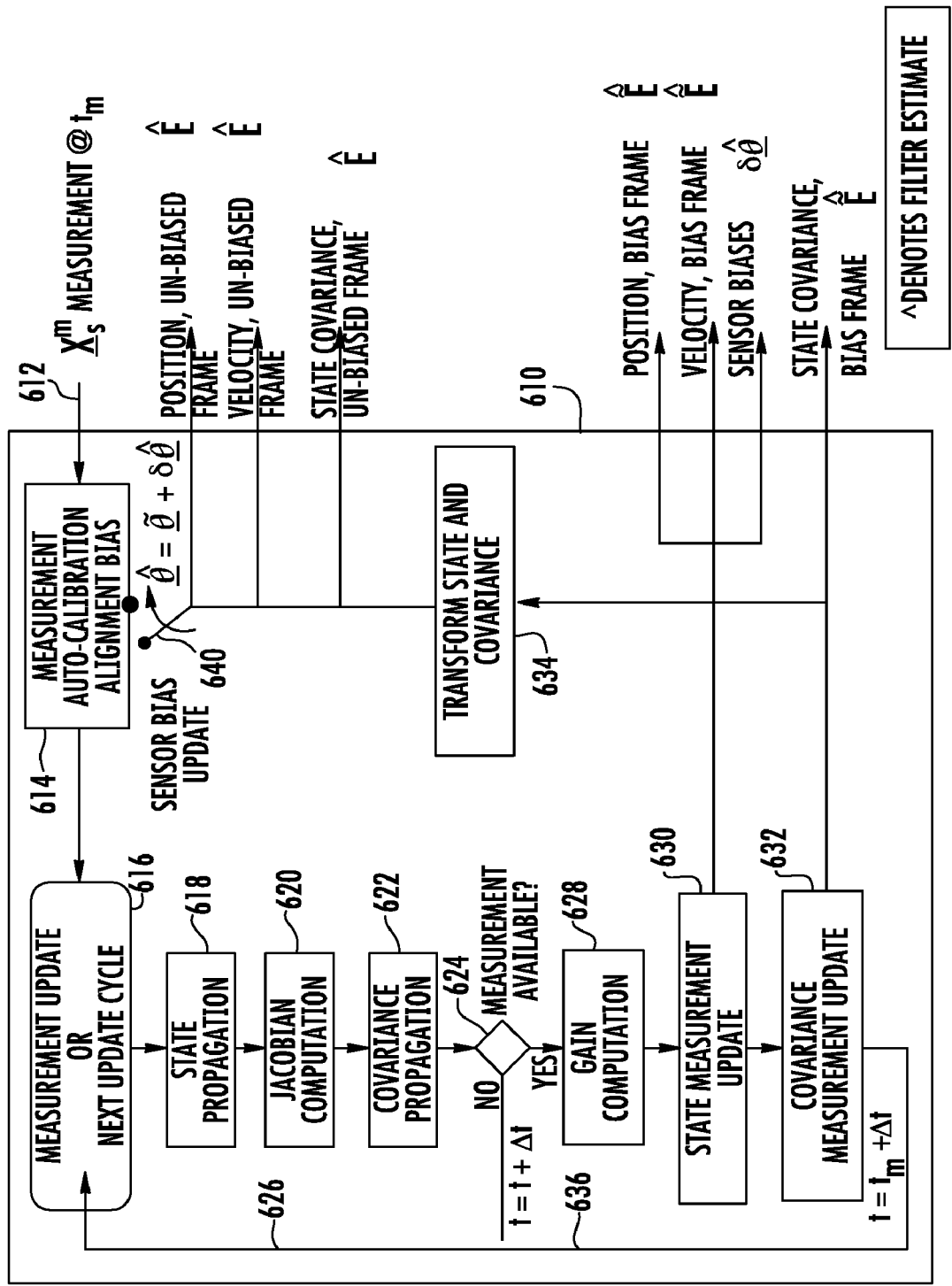
FIG. 6: ISSAC FUNCTIONAL BLOCK DIAGRAM

INSTANTANEOUS MULTISENSOR ANGULAR BIAS AUTOREGISTRATION

FIELD OF THE INVENTION

This invention relates to methods for angular registration of sensor systems, such as radar systems, to the environment in a manner that can be substantially concurrent with the taking of measurements.

BACKGROUND OF THE INVENTION

Engagement coordination for advanced missile defense systems is subject to sensor registration errors occurring during handover between each system. Thus, the sensors require registration in order to reduce such registration errors during handover. In addition, each sensing system or element will need to angularly register its sensors to local geodetic coordinate systems in order to minimize the tracking and guidance errors and to provide additional margin to the associated weapon system's pointing and divert error budgets. "Divert" is the amount of position error a weapon can "take out" or accommodate during the terminal guidance phase.

FIG. 1 is a simplified perspective or isometric view of a ship 10 with an array 12 of radar faces 14a, 14b, illustrating the pointing and divert errors due to radar face bias registration error. In FIG. 1, the true position of a target to be defended against is illustrated as 16t, and the true position of a missile for engaging the target is illustrated as 18t. The actual line-of-sight between the radar face 14b and the target and missile are designated as 17t and 19t, respectively. In addition to the yaw, pitch and roll motion of the ship, which may introduce errors into the target and missile tracking systems, radar face angular registration errors, illustrated by an incremental angle $\delta\theta$, result in apparent target and missile lines-of-sight designated 21a and 23a, respectively. Thus, the relative directions in which the target and the missile are sensed relative to the ship 10 differ from the actual directions.

The incremental error angle $\delta\theta$ not only results in a different apparent direction of the target and missile, but also results in a different apparent heading. This may be understood by considering missile 18t of FIG. 1, which may be considered as heading along the actual line-of-sight path 19t. Since the registration error $\delta\theta$ makes the apparent line-of-sight diverge from the actual line-of-sight, it also makes the missile heading appear to differ from the actual heading by $\delta\theta$, so that the apparent heading of the missile does not coincide with the actual heading, as suggested by missile symbol 18ah. For the same reasons, the apparent heading of the target is illustrated as 16ah, and differs from the actual target heading.

In addition to the errors in apparent heading of the target and the missile in FIG. 1, the face angular registration errors $\delta\theta$ also tend to cause an apparent translation error in the positions of the target and the missile. In FIG. 1, the apparent target location is shown as 16al, lying along apparent line-of-sight 21a, and the apparent missile location is shown as 18al, lying along apparent line-of-sight 23a. Thus, both the apparent lines-of-sight and the apparent headings of the target and the missile differ from the actual values due to misregistration of the radar system faces.

Current technology in system bias registration relies on pre-engagement (non-real-time) algorithms that require supplemental data such as satellite ephemeris to provide a reference for the registration bias estimation. ARCHER is such an algorithm. ARCHER was developed by Nichols Research, part of Computer Science Corporation (CSC), the address of which is 333 W. El Camino Real, Sunnyvale, Calif. These registration algorithms provide sensor bias registration during non-tactical engagement periods, sometimes hours or days prior to the tactical engagement. Such time differences may reduce the quality or effectiveness of the registration due to latency and also due to the fact that the biases are time varying, sometimes on the order of minutes, depending on the time of day and the environment.

Improved and or alternative target tracking and sensor registration systems are desired.

SUMMARY OF THE INVENTION

A method for real-time target tracking and sensor angular alignment estimation and amelioration, for targets having known acceleration, comprises the step of measuring with at least one sensor at least one of (a) line-of-sight and (b) position of the target, to produce target track state measurement information for each sensor, where the target track state information includes unwanted angular bias errors attributable to each sensor. The method also includes the step of filtering the target track state measurement information with a filter to produce updated target track state information with reduced angular bias errors, and using the updated target track state information as indicative of the target. In a particular mode of the method, the step of filtering includes the step of generating estimates of the angular bias errors, and applying the estimated angular bias errors to another or subsequent target tracking event.

In a particular mode of the method, the step of filtering includes the steps of, when measurements are received, correcting the measurements for known alignment bias and for previously determined estimated sensor alignment biases, to thereby produce corrected measurements, and at least when corrected measurements are received, producing estimated target state derivative vectors by updating the filter time reference to the measurement time to produce propagated state derivative vectors. In this mode, the Jacobian of the state dynamics equation providing for observability into the sensor alignment bias through at least gravitational and coriolis forces is determined. From the Jacobian of the state dynamics equation, the target state transition matrix and the target error covariance matrix are propagated. If, following the target state transition matrix and target error covariance matrix propagation, a measurement is not available, the steps of producing estimated target state derivative vectors, determining the Jacobean, and propagating the target state transition and target error covariance matrices are repeated; and if a measurement is available, the Kalman gain matrix is calculated using a measurement matrix and the error covariance matrix. The state vector is updated to produce an updated state vector and estimated sensor alignment biases. The covariance measurement is updated to produce an updated covariance measurement. The state vector and covariance measurements are transformed to an estimated stable space frame to produce the updated target track state information with reduced angular bias errors.

In the particular mode of the method, the step of propagating the state derivative vectors may be performed by numerical integration of the state derivative vector from a prior time. The step of determining the Jacobian of the state dynamics equation may include the step of determining the Jacobian of the state dynamics equation according to $$J = \left[\frac{\partial \dot{s}}{\partial s}\right] = \left[\frac{\partial \dot{s}}{\partial X_E} \frac{\partial \dot{s}}{\partial \dot{X}_E} \frac{\partial \dot{s}}{\partial \delta \underline{\theta}}\right] = \begin{bmatrix} 0_{3\times 3} & I_{3\times 3} & 0_{3\times 3} \\ \frac{\partial \ddot{X}_E}{\partial X_E} & \frac{\partial \ddot{X}_E}{\partial \dot{X}_E} & \frac{\partial \ddot{X}_E}{\partial \delta \underline{\theta}} \\ 0_{3\times 3} & 0_{3\times 3} & 0_{3\times 3} \end{bmatrix} \quad (10)$$

where:

$$\frac{\partial \ddot{X}_E}{\partial X_E} = -\frac{\mu}{(\hat{Z}_E \cdot \hat{Z}_E)^{\frac{3}{2}}} \left[I_{3\times 3} - \frac{3}{(\hat{Z}_E \cdot \hat{Z}_E)}[\hat{Z}_E \cdot \hat{Z}_E^T]\right] - [[\hat{\omega}_E]] \cdot [[\hat{\omega}_E]]$$

$$\frac{\partial \ddot{X}_E}{\partial \dot{X}_E} = -2 \cdot [[\hat{\omega}_E]]$$

$$\frac{\partial \ddot{X}_E}{\partial \delta \underline{\theta}} = -\frac{\mu}{(\hat{Z}_E \cdot \hat{Z}_E)^{\frac{3}{2}}} \left[I_{3\times 3} - \frac{3}{(\hat{Z}_E \cdot \hat{Z}_E)}[\hat{Z}_E \cdot \hat{Z}_E^T]\right] \cdot [[\hat{R}_E]] \cdot \hat{T}_P^{\hat{E}}(t_i) -$$

$$2 \cdot [[\hat{X}_E]] \cdot [[\hat{\omega}_E]] \cdot$$

$$\hat{T}_P^{\hat{E}}(t_i) + \left[[[\hat{\omega}_E]] \cdot [[\hat{X}_E]] \cdot [[\hat{\omega}_E]] + [[\hat{\omega}_E]] \cdot [[\hat{R}_E]] \cdot [[\hat{\omega}_E]] + \right.$$

$$[[[\hat{\omega}_E]] \cdot \hat{X}_E]] \cdot [[\hat{\omega}_E]] + [[[\hat{\omega}_E]] \cdot \hat{R}_E]] \cdot [[\hat{\omega}_E]] -$$

$$[[\hat{\omega}_E]] \cdot [[\hat{\omega}_E]] \cdot [[\hat{R}_E]]] \cdot \hat{T}_P^{\hat{E}}(t_i)$$

and $$\hat{R}_{\hat{E}} = \hat{T}_E^{\hat{E}} \cdot R_E$$

$$\hat{\omega}_{\hat{E}} = \hat{T}_E^{\hat{E}} \cdot \omega_E$$

$$\hat{T}_E^{\hat{E}} = T_P^E(t_i) \cdot [I_{3\times 3} + [[\underline{\hat{\theta}} + \delta \underline{\hat{\theta}}]]] \cdot T_E^P(t_i)$$

and the [[.]] notation denotes a skew symmetric matrix of the vector argument.

Further in the mode of the method, the step of approximating the state transition matrix used for the time propagation of the error covariance may include use of the approximation $$\Phi \approx I + J\Delta t + 0.5 J^2 \Delta t^2 \quad (12)$$

and may also includes time propagating the error covariance matrix P with the equation $$P(t_i) = \Phi P(t_{i-1})\Phi^T + Q_i \quad (14)$$

where Q is the state noise matrix.

Additionally, the mode of the method may include the step of time propagating the error covariance matrix includes the step of determining the state noise matrix Q using the equation $$Q = \int_0^{\Delta t} \Phi W \Phi^T d\tau \quad (16)$$

where:

$W = E(\underline{w}(\tau)\underline{w}(\tau)^T)$; and $\underline{w}(\tau)$ is the 9×1 state noise vector of white noise.

In the mode of the method of the invention the step of calculating the Kalman gain matrix using the measurement matrix and the error covariance matrix may comprise the step of calculating the Kalman gain matrix as $$K = P(t_i) \cdot H^T \cdot (H \cdot P(t_i) \cdot H^T + R)^{-1} \quad (18)$$

where:

$H = [I_{3\times 3} \ 0_{3\times 3} \ 0_{3\times 3}]$ is the measurement matrix; and R is the measurement noise covariance matrix associated with the currently reporting sensor defined in the stable space frame $$R = \hat{T}_P^E(t_i) \cdot \hat{T}_S^P(\underline{\hat{\phi}}) \cdot \Sigma \cdot \hat{T}_P^S(\underline{\hat{\phi}}) \cdot \hat{T}_E^P(t_i) \quad (20)$$

with:

$\Sigma$ denoting the measurement noise matrix as represented in the sensor frame.

The mode of the method may also include the step of transforming the state vector and covariance measurements to an estimated stable space frame including the steps of:

$$\hat{X}_E = T_{\hat{E}}^E \cdot \hat{X}_{\hat{E}}$$

$$\hat{\dot{X}}_E = T_{\hat{E}}^E \cdot \hat{\dot{X}}_{\hat{E}}$$

$$P_{XX} = P_{\hat{X}\hat{X}} + [[\hat{X}_E]] \cdot \hat{T}_P^E(t_i) \cdot P_{\theta\theta} \cdot \hat{T}_E^P(t_i) \cdot [[\hat{X}_E]]^T + \hat{T}_{\hat{E}}^E \cdot P_{\hat{X}_\theta} \cdot \hat{T}_E^P(t_i) \cdot$$

$$[[\hat{X}_E]]^T + [[\hat{X}_E]] \cdot \hat{T}_P^E(t_i) \cdot P_{\hat{X}_\theta}^T \cdot T_E^{\hat{E}}$$

$$P_{\dot{X}\dot{X}} = P_{\hat{\dot{X}}\hat{\dot{X}}} + [[\hat{\dot{X}}_E]] \cdot \hat{T}_P^E(t_i) \cdot P_{\theta\theta} \cdot \hat{T}_E^P(t_i) \cdot [[\hat{\dot{X}}_E]]^T + \hat{T}_{\hat{E}}^E \cdot P_{\hat{\dot{X}}_\theta}^T \cdot \hat{T}_E^P(t_i) \cdot$$

$$[[\hat{\dot{X}}_E]]^T + [[\hat{\dot{X}}_E]] \cdot \hat{T}_P^E(t_i) \cdot P_{\hat{\dot{X}}_\theta}^T \cdot T_E^{\hat{E}}$$

where $$P(t_i) = \begin{bmatrix} P_{\hat{X}\hat{X}} & P_{\hat{X}\hat{\dot{X}}} & P_{\hat{X}\theta} \\ P_{\hat{X}\hat{\dot{X}}}^T & P_{\hat{\dot{X}}\hat{\dot{X}}} & P_{\hat{\dot{X}}\theta} \\ P_{\hat{X}\theta}^T & P_{\hat{\dot{X}}\theta}^T & P_{\theta\theta} \end{bmatrix}$$

$$\hat{T}_E^E = T_P^E(t_i) \cdot [I_{3\times 3} - [[\underline{\hat{\theta}}]]] \cdot T_E^P(t_i)$$

$$\underline{\hat{\theta}} = \underline{\bar{\theta}} + \delta \underline{\hat{\theta}}.$$

BRIEF DESCRIPTION OF THE DRAWING

FIG. 1 is a simplified perspective or isometric view of a ship with an array of radar faces, illustrating pointing and divert errors attributable to radar face bias registration error;

FIG. 2 heuristically illustrates Newton's "falling apple" principle as applied to a slight incline making an angle δθ with the horizontal component of the true reference frame;

FIG. 3 illustrates the information of FIG. 2 in a somewhat more formal manner and as applied to a tracking system;

FIG. 4 is a representation of a 3-dimensional coordinate system with various definitions;

FIG. 5 illustrates coordinate lines illustrating relationships or transformations among various reference frames; and FIG. 6 is a functional block diagram illustrating the operation of an Instantaneous Sensor Alignment Auto-Calibration (ISAAC) according to an aspect of the invention.

DESCRIPTION OF THE INVENTION

According to an aspect of the invention, an "Instantaneous Sensor Alignment Auto-Calibration" (ISAAC) ballistic target track state estimator incorporates an extended Kalman filter algorithm. The extended Kalman filter algorithm includes an embedded real-time sensor registration bias algorithm that requires no ephemeris and provides an instantaneous or real-time estimate of the sensor registration angular bias. The ISAAC system may be used by itself, or preferably in conjunction with the non-real-time algorithms (ARCHER, for example). ISAAC will supplement these algorithms by providing real-time updates to the bias registration error that may have incurred due to latency, while at the same time providing an enhanced ballistic track state estimate, unencumbered by registration angular bias errors. ISAAC achieves angular sensor bias registration relative to the local geodetic coordinate system using a relatively simple concept based on the "falling apple" principle, discovered by Sir Isaac Newton (and thus the serendipitous acronym ISAAC).

FIG. 2 illustrates an aspect of Newton's "falling apple" principle. In FIG. 2, Sir Isaac Newton 205, not knowing that he is standing on a slight incline 210 making an angle $\delta\theta$ with the horizontal component 211 of the true reference frame, has just witnessed an apple 212 falling to the "ground" (the inclined plane 210). As the apple 212 is falling, Isaac plots the course 214 of the apple based on the gravitational theories that he has just discovered and published in Principia. To his chagrin, the apple 212 fails to fall straight down along a path 214 as his theory predicts, rather it falls with a different trajectory 216 and settles on the ground 210. Upon observing the apple fall with a "tilted" trajectory 216, Isaac surmises it was caused by either 1) his gravitational theory being wrong, or 2) his definition of "Up" is wrong. Being certain of his gravitational theory, he asserts that his definition of Up is in error, concludes that he is standing on an incline and correctly estimates the incline of the hill. Thus the apple 212 fell correctly in the tilted reference frame, with an apparent sideways acceleration or deviation 218 caused by that component of gravity perpendicular to the Up axis of the tilted frame.

A slightly more rigorous or mathematical explanation of a missile tracking situation is described in FIG. 3 in conjunction with the three-dimensional geometry 410 illustrated in FIG. 4. In FIG. 4, the Earth's center is designated 412. The sensor system to be angularly registered is shown as being a ship-borne radar system 414 located at a radius R from Earth center 412. The current position of an ascending ballistic target is illustrated as 416. In this context, the term "ballistic" means that no aerodynamic or thrust forces act on the vehicle, or put another way, that only the target's momentum and the force of gravity determine the target's trajectory. The radius from Earth's center 412 to the current position of the target is designated Z. A line-of-sight from sensor 414 to the target 416 is designated X. Also illustrated in FIG. 4 is an Earth-rate (rotation) vector $\omega$. The true trajectory of ballistic target 416 is represented as a dash line 418, and the projected or biased trajectory attributable to the misaligned observer reference frame of FIG. 3 is illustrated in FIG. 4 as a dotted line 420.

In FIGS. 3 and 4, the misaligned sensor reference frame induces an error in the ballistic target propagation 420 due to the gravity vector being incorrectly represented in the sensor measurement frame. Over time, this error manifests itself as a position error. The ISAAC filter according to an aspect of the invention incorporates a dynamics propagation algorithm that estimates the bias perpendicular to the local gravity vector, and also the bias perpendicular to the coriolis acceleration vector, providing complete observability of the total registration bias errors.

FIG. 5 is a coordinate frame diagram aiding in understanding the invention, and also lists and defines various terms used in the explanation. FIG. 5 illustrates two coordinate frame diagrams 510 and 512. Starting from the top (Truth) line 510 of FIG. 5, and reading the transformations from left to right, the E frame or node represents the stable space frame, which may be Earth-Centered Earth-fixed (ECEF), East-North-Up (ENU), or Earth Centered Inertial (ECI). The sensor location vector $\underline{R}_E$ and the earth's angular velocity vector $\omega_E$ are known exactly in this frame, where the underscore throughout this document denotes a vector quantity. The P frame or node on line 510 represents the platform frame (e.g. ship's deck frame) that may be moving relative to the E frame, as for example due to wave motion. The matrix $T_E^P(t)$ represents the coordinate transformation from E to P, where (t) denotes a time dependency. The matrix $T_P^S(\underline{\theta})$ represents the coordinate transformation from P to the S sensor frame, where $\underline{\theta}$ denotes the actual (unknown) rotation angles between P and S. The S node or sensor frame represents the measurement sensor coordinate system. Measurement vector $\underline{X}_S^m$ is known exactly in the S sensor frame.

The bottom line 512 of FIG. 5 represents the nominal (biased) coordinate reference system lineage; here lineage refers to the sequence of transformations going from the sensor frame to the stable space frame for both the upper and lower lines. The $\tilde{E}$ frame (the tilde () refers to the biased frame throughout this document) represents the biased stable space E frame (e.g. biased ECEF, ENU, or ECI) that a system filter would mistakenly work within if it were to transform the measurement vector $\underline{X}_S^m$ from the S sensor frame to the expected stable frame E using the nominal coordinate transformation matrices $$T_{\tilde{P}}^S(\underline{\hat{\theta}}) \text{ and } T_E^{\tilde{S}}(t)(=T_E^S(t)=T_P^S(\theta)^*T_E^P(t))$$

where the matrices refer to the transformation from $\tilde{P}$ to S thru the angle $\underline{\hat{\theta}}$ and the transformation from $\tilde{E}$ to $\tilde{S}$, respectively, where $\tilde{P}$ denotes the nominal (biased) platform frame, and $\tilde{S}$ denotes the nominal (biased) sensor frame, and $\tilde{E}$ denotes the nominal (biased) stable space frame. Note that the biased platform transformation matrix can be represented as a bias in the E frame using the similarity transformation $T_E^{\tilde{E}}=T_P^E(t)T_{\tilde{P}}^{\tilde{P}}(\delta\underline{\tilde{\theta}})T_E^P(t)$.

Bias between the E and P frames may be taken into consideration if the bias is significant. In such a case, the ISAAC state vector, $\underline{s}$, may be augmented to include that bias, using a modeling technique similar to that used for $\underline{\theta}$. For simplicity of description and without loss of generality, the transformation from the E frame to the P frame is taken as un-biased and only time-dependent.

In order to develop the ISAAC filter equations, it is assumed that the target is either ballistic (falling under the force of gravity) or else the specific force (i.e. thrust acceleration) is known exactly and can be compensated for. Additionally, due to the high altitudes at which target tracking occurs, it is assumed that atmospheric drag effects are negligible or can be properly compensated for.

Given these assumptions, the following equations describe the model used for the ISAAC target kinematics:

$$\ddot{\underline{X}}_E = \frac{-\mu \underline{Z}_E}{|\underline{Z}_E|^3} + \underline{A}_E - \underline{\omega}_E \times (\underline{\omega}_E \times \underline{Z}_E) - 2\underline{\omega}_E \times \dot{\underline{X}}_E \quad (2)$$

$$\underline{Z}_E = \underline{R}_E + \underline{X}_E$$

where:

$\ddot{\underline{X}}_E$ is the target acceleration vector, represented in the stable space frame;

$\mu$ is the Earth gravitational constant;

$Z_E$ is target position vector from the center of the earth, represented in the stable space frame;

$A_E$ is a known specific force which includes (but is not limited to) effects such as higher order gravitational effects;

$\omega_E$ is earth angular velocity vector, represented in the stable space frame;

$\dot{X}_E$ is target velocity vector, represented in the stable space frame; and $R_E$ is the location of the reporting sensor in the stable space frame.

Without loss of generality, the remainder of this discussion omits the $A_E$ term for conciseness and includes only the dominant gravity term due to $\mu$. It is further assumed that the location of the reporting sensor $R_E$ is known exactly.

The ISAAC state vector $s$ is given by $$s = \begin{Bmatrix} X_{\tilde{E}} \\ \dot{X}_{\tilde{E}} \\ \delta\underline{\theta} \end{Bmatrix} \quad (4)$$

where:

$X_{\tilde{E}}$ is target position vector referenced to the biased stable space frame $\tilde{E}$;

$\dot{X}_{\tilde{E}}$ is target velocity vector referenced to the biased stable space frame $\tilde{E}$; and $\delta\underline{\theta}$ is (are) registration bias state vector(s) for all reporting sensors, referenced relative to the platform frame P.

The ISAAC dynamics equations (i.e. the nonlinear ISAAC state derivative ($\dot{s}$) equations) are $$\dot{s} = \begin{Bmatrix} \dot{X}_{\tilde{E}} \\ \ddot{X}_{\tilde{E}} \\ \delta\underline{\dot{\theta}} \end{Bmatrix} = \begin{Bmatrix} \dot{X}_{\tilde{E}} \\ \frac{-\mu Z_{\tilde{E}}}{|Z_{\tilde{E}}|^3} - \omega_{\tilde{E}} \times (\omega_{\tilde{E}} \times Z_{\tilde{E}}) - 2\dot{\omega}_{\tilde{E}} \times \dot{X}_{\tilde{E}} \\ \underline{0}_{3\times 1} \end{Bmatrix} \quad (6)$$

where: $\ddot{X}_{\tilde{E}}$ is the target acceleration vector referenced to the biased stable space frame $\tilde{E}$;

These equations are based on the assumed target kinematics of Equation (2). Additionally, it is assumed that all sensor registration biases are constant.

FIG. 6 is a simplified functional logic flow chart or diagram 610 illustrating the processing for ISAAC according to an aspect of the invention. In FIG. 6, The ISAAC process begins with an initial position measurement $X_S^m$, made at time $t_m$, from a sensor tracking a ballistic target, which measurement is applied by way of a path 612 to a measurement auto-calibration alignment bias function or block 614. The measurement at time $T_m$ is corrected in block 614 for known alignment biases in the measurement auto-calibration alignment bias function. This function applies to the measurements the nominal alignment correction as known in the prior art, together with the sensor alignment bias estimate from the previous ISAAC bias estimation event or iteration. It will be clear that once the sensor angular alignment bias estimate is available, it can be combined with the known alignment biases and compensated for as in the prior art. The logic of FIG. 6 flows from function or block 614 to a Measurement Update or Next Update Cycle function 616, which determines whether the state and covariance estimates for the current time iteration are to include a measurement update. The ISAAC processing operates at a predetermined nominal cycle rate, with measurement updates occurring asynchronously as they become available. From block or function 616, the logic 610 flows to a block 618, representing the state propagation function. State Propagation function 618 propagates the ISAAC state vector $s$, preferably using a high order numerical integration algorithm.

Time propagation of the ISAAC state vector $s$ in function 618 of FIG. 6 is performed by numerically integrating the state derivative vector from the previous time $t_{i-1}$ to the current time $t_i$ where the subscript i refers to the filter cycle iteration:

$$\hat{s}(t_i) = \hat{s}(t_{i-1}) + \int_{t_{i-1}}^{t_{i-1}+\Delta t} \hat{\dot{s}}(\tau)d\tau \quad (8)$$

In this description, a $\hat{\phantom{x}}$ notation is used to denote filter estimates of the respective variables. A $4^{th}$ order Runge Kutta algorithm might be used for the integration process associated with function 618. The incremental time step $\Delta t$ refers to either the nominal update cycle time or the incremental time step from the last cycle time to the current measurement time $t_M$ (i.e. $\Delta t = t_m - t_{i-1}$). At the first iteration around the loop including blocks 616 through 632 of FIG. 6, function 618 also initializes the state and covariance for the subsequent iterations.

From function or block 618 of FIG. 6, the logic flows to Jacobian computation function or block 620. In general, the Jacobian Computation function 620 computes the state transition matrix for the ISAAC extended Kalman filter algorithm. The ISAAC Jacobian matrix computation function 620 incorporates an innovative formulation of the state dynamics that provides the observability into the sensor alignment bias through the gravitational and coriolis forces.

The observability into the $\delta\underline{\theta}$ state is realized through the Jacobian J of the state dynamics equation $$J = \left[\frac{\partial \dot{s}}{\partial s}\right] = \left[\frac{\partial \dot{s}}{\partial X_{\tilde{E}}} \frac{\partial \dot{s}}{\partial \dot{X}_{\tilde{E}}} \frac{\partial \dot{s}}{\partial \delta\underline{\theta}}\right] = \begin{bmatrix} 0_{3\times 3} & I_{3\times 3} & 0_{3\times 3} \\ \frac{\partial \ddot{X}_{\tilde{E}}}{\partial X_{\tilde{E}}} & \frac{\partial \ddot{X}_{\tilde{E}}}{\partial \dot{X}_{\tilde{E}}} & \frac{\partial \ddot{X}_{\tilde{E}}}{\partial \delta\underline{\theta}} \\ 0_{3\times 3} & 0_{3\times 3} & 0_{3\times 3} \end{bmatrix} \quad (10)$$

where:

$$\frac{\partial \ddot{X}_{\tilde{E}}}{\partial X_{\tilde{E}}} = -\frac{\mu}{(\hat{Z}_{\tilde{E}} \cdot \hat{Z}_{\tilde{E}})^{\frac{3}{2}}}\left[I_{3\times 3} - \frac{3}{(\hat{Z}_{\tilde{E}} \cdot \hat{Z}_{\tilde{E}})}[\hat{Z}_{\tilde{E}} \cdot \hat{Z}_{\tilde{E}}^T]\right] - [[\hat{\omega}_{\tilde{E}}]] \cdot [[\hat{\omega}_{\tilde{E}}]]$$

$$\frac{\partial \ddot{X}_{\tilde{E}}}{\partial \dot{X}_{\tilde{E}}} = -2 \cdot [[\hat{\omega}_{\tilde{E}}]]$$

$$\frac{\partial \ddot{X}_{\tilde{E}}}{\partial \delta\underline{\theta}} = -\frac{\mu}{(\hat{Z}_{\tilde{E}} \cdot \hat{Z}_{\tilde{E}})^{\frac{3}{2}}}\left[I_{3\times 3} - \frac{3}{(\hat{Z}_{\tilde{E}} \cdot \hat{Z}_{\tilde{E}})}[\hat{Z}_{\tilde{E}} \cdot \hat{Z}_{\tilde{E}}^T]\right] \cdot [[\hat{R}_{\tilde{E}}]] \cdot \hat{T}_P^{\tilde{E}}(t_i) -$$

$$2 \cdot [[\hat{\dot{X}}_{\tilde{E}}]] \cdot [[\hat{\omega}_{\tilde{E}}]] \cdot$$

$$\hat{T}_P^{\tilde{E}}(t_i) + \left[[[\hat{\omega}_{\tilde{E}}]] \cdot [[\hat{X}_{\tilde{E}}]] \cdot [[\hat{\omega}_{\tilde{E}}]] + [[\hat{\omega}_{\tilde{E}}]] \cdot [[\hat{R}_{\tilde{E}}]] \cdot [[\hat{\omega}_{\tilde{E}}]] + \right.$$

$$[[[\hat{\omega}_{\tilde{E}}]] \cdot \hat{X}_{\tilde{E}}]] \cdot [[\hat{\omega}_{\tilde{E}}]] + [[[\hat{\omega}_{\tilde{E}}]] \cdot \hat{R}_{\tilde{E}}]] \cdot [[\hat{\omega}_{\tilde{E}}]] -$$

$$[[\hat{\omega}_{\tilde{E}}]] \cdot [[\hat{\omega}_{\tilde{E}}]] \cdot [[\hat{R}_{\tilde{E}}]]\right] \cdot \hat{T}_P^{\tilde{E}}(t_i)$$

and $$\hat{R}_{\bar{E}} = \hat{T}_{E}^{\bar{E}} \cdot R_E$$

$$\hat{\omega}_{\bar{E}} = \hat{T}_{E}^{\bar{E}} \cdot \omega_E$$

$$\hat{T}_E^{\bar{E}} = T_P^E(t_i) \cdot [I_{3\times3} + [[\tilde{\theta} + \delta\hat{\theta}]]] \cdot T_E^P(t_i)$$

The [[.]] notation denotes a skew symmetric matrix of the vector argument.

The Covariance Propagation function 622 of FIG. 6 performs the traditional Kalman filter time propagation of the state covariance matrix utilizing the state transition matrix. This covariance propagation function nominally operates faster than the measurement updates to reduce non-linear effects when measurement updates occur at slow update rates; this is a traditional method used in the art to reduce the effects of non-linearities in the measurement on the covariance propagation. The state transition matrix used for the time propagation of the ISAAC error covariance in block 622 can be approximated as $$\Phi \approx I + J\Delta t + 0.5 J^2 \Delta t^2 \quad (12)$$

Time propagation of the ISAAC error covariance matrix P is performed with the equation $$P(t_i) = \Phi P(t_{i-1}) \Phi^T + Q_i \quad (14)$$

where Q is the ISAAC state noise matrix. The state noise matrix may be determined using the equation $$Q = \int_0^{\Delta t} \Phi W \Phi^T d\tau \quad (16)$$

where:

$W = E(\underline{w}(\tau) \underline{w}(\tau)^T)$; and $\underline{w}(\tau)$ is the 9×1 state noise vector of white noise.

The logic flows from covariance propagation function 622 of FIG. 6 to a decision block 624, which determines if a measurement is currently available. If a measurement is not available, then the logic leaves decision block 624 by the NO output, time is incremented by the nominal $\Delta t$ propagation time rate, and control is passed by way of a logic path 626 to the function 616 representing the start of the iteration loop. If a measurement is available, the logic leaves decision block by the YES output, and flows to a Gain Computation function 628.

Gain Computation function 628 of FIG. 6 constructs the standard Kalman filter gain matrix. The Kalman gain matrix is calculated using the measurement matrix and the ISAAC error covariance matrix $$K = P(t_i) \cdot H^T \cdot (H \cdot P(t_i) \cdot H^T + R)^{-1} \quad (18)$$

where:

$H = [I_{3\times3} \ 0_{3\times3} \ 0_{3\times3}]$ is the measurement matrix; and R is the measurement noise covariance matrix associated with the currently reporting sensor defined in the stable space frame $$R = \hat{T}_P^E(t_i) \cdot \hat{T}_S^P(\hat{\theta}) \cdot \Sigma \cdot \hat{T}_P^S(\hat{\theta}) \cdot \hat{T}_E^P(t_i) \quad (20)$$

with:

$\Sigma$ denoting the measurement noise matrix as represented in the sensor frame.

From function or block 628, the logic of FIG. 6 flows to a State Measurement Update function 630. State Measurement Update function 630 computes the measurement and state residuals and updates the ISAAC state vector including the sensor registration bias estimate. More particularly, the sensor registration bias estimating function of block 630 updates the ISAAC state vector using $$\hat{\underline{s}} = \hat{\underline{s}} + K \cdot \Delta \underline{m} \quad (22)$$

where the measurement residual $\Delta \underline{m}$ is defined as $$\Delta \underline{m} = \hat{T}_P^E(t_i) \cdot \hat{T}_S^P(\hat{\theta}) \cdot \underline{X}_S^m(t_i) - H \cdot \hat{\underline{s}} \quad (24)$$

$$\hat{\underline{\theta}} = \hat{\underline{\theta}} + \delta\hat{\underline{\theta}} \quad (26)$$

and where the target position and velocity are estimated in the bias frame $\bar{E}$ of the estimated state vector $\hat{\underline{s}}$, and the sensor biases $\delta\hat{\underline{\theta}}$, are made available external to the processing 610 of FIG. 6.

Finally, the Covariance Measurement Update function 632 of FIG. 6 performs the measurement update of the state covariance matrix. The ISAAC state covariance matrix measurement update is $$P(t_i) = (I - K \cdot H) \cdot P(t_i) \cdot (I - K \cdot H)^T + K \cdot R \cdot K^T \quad (28)$$

The logic increments time $t = t_m + \Delta t$ and loops back from block 632 to the beginning of the iteration loop by way of a logic path 636, 626. The updated state and covariance matrices are made available to a Transform State and Covariance function 634 and are also output from ISAAC processing block 610.

The state vector (target position and velocity) and covariance, represented in the biased stable space frame, are output from the ISAAC algorithm 610. In addition, the Transform State and Covariance function represented by block 634 transforms the state vector and covariance estimates to the stable space frame (measured or unbiased frame) E by equations 30, 32, 34, and 36

$$\hat{X}_E = T_{\bar{E}}^E \cdot \hat{X}_{\bar{E}}$$

$$\hat{\tilde{X}}_E = T_{\bar{E}}^E \cdot \hat{\tilde{X}}_{\bar{E}}$$

$$P_{XX} = P_{\hat{X}\hat{X}} + [[\hat{X}_E]] \cdot \hat{T}_P^E(t_i) \cdot P_{\theta\theta} \cdot \hat{T}_E^P(t_i) \cdot [[\hat{X}_E]]^T + \hat{T}_{\bar{E}}^E \cdot P_{\hat{X}\theta} \cdot \hat{T}_E^P(t_i) \cdot [[\hat{X}_E]]^T + [[\hat{X}_E]] \cdot \hat{T}_P^E(t_i) \cdot P_{\hat{X}\theta}^T \cdot T_E^{\bar{E}}$$

$$P_{\tilde{X}\tilde{X}} = P_{\tilde{X}\tilde{X}} + [[\tilde{X}_E]] \cdot \hat{T}_P^E(t_i) \cdot P_{\theta\theta} \cdot \hat{T}_E^P(t_i) \cdot [[\tilde{X}_E]]^T + \hat{T}_{\bar{E}}^E \cdot P_{\tilde{X}\theta}^T \cdot \hat{T}_E^P(t_i) \cdot [[\tilde{X}_E]]^T + [[\tilde{X}_E]] \cdot \hat{T}_P^E(t_i) \cdot P_{\tilde{X}\theta}^T \cdot T_E^{\bar{E}}$$

where $$P(t_i) = \begin{bmatrix} P_{\hat{X}\hat{X}} & P_{\hat{X}\tilde{X}} & P_{\hat{X}\theta} \\ P_{\hat{X}\tilde{X}}^T & P_{\tilde{X}\tilde{X}} & P_{\tilde{X}\theta} \\ P_{\hat{X}\theta}^T & P_{\tilde{X}\theta}^T & P_{\theta\theta} \end{bmatrix}$$

$$\hat{T}_{\bar{E}}^E = T_P^E(t_i) \cdot [I_{3\times3} - [[\hat{\theta}]]] \cdot T_E^P(t_i)$$

and state vector and covariance to the estimated stable space frame are output from the ISAAC algorithm 610. At the end of each tracking event, the sensor bias estimate $\hat{\underline{\theta}}$ is updated using $$\hat{\underline{\theta}} = \hat{\underline{\theta}} + \delta\hat{\underline{\theta}} \quad (38)$$

and is applied by way of a path illustrated as including a switch 640 for use in block 614 as the starting sensor bias for the next tracking event.

A method for real-time target tracking and sensor angular alignment estimation and amelioration, for targets having known acceleration, comprises the step of measuring (612) with at least one sensor at least one of (a) line-of-sight and (b) position of the target, to produce target track state measurement information for each sensor, where the target track state information includes unwanted angular bias errors attributable to each sensor. The method also includes the step of filtering the target track state measurement information with a filter (616, 618, 620, 622, 624, 628, 630, 632, 634) to produce updated target track state information with reduced angular bias errors, and using the updated target track state information as indicative of the target. In a particular mode of the method, the step of filtering includes the step of generating estimates (616, 618, 620, 622, 624, 628, 630, 632, 634) of the angular bias errors, and applying (614, 640) the estimated angular bias errors to another or subsequent target tracking event.

In a particular mode of the method, the step of filtering includes the steps of, when measurements are received, correcting the measurements (614) for known alignment bias and for previously determined estimated sensor alignment biases, to thereby produce corrected measurements, and at least when corrected measurements are received, producing (616) estimated target state derivative vectors by updating the filter time reference to the measurement time to produce (618) propagated state derivative vectors. In this mode, the Jacobian of the state dynamics equation providing for observability into the sensor alignment bias through at least gravitational and coriolis forces is determined (620). From the Jacobian of the state dynamics equation, the target state transition matrix and the target error covariance matrix are propagated (622). If, following the target state transition matrix and target error covariance matrix propagation, a measurement is not available, the steps of producing estimated target state derivative vectors (618), determining the Jacobean (620), and propagating the target state transition and target error covariance matrices (622) are repeated; and if a measurement is available (624), the Kalman gain matrix is calculated (628) using a measurement matrix and the error covariance matrix. The state vector is updated (630) to produce an updated state vector and estimated sensor alignment biases. The covariance measurement is updated (632) to produce an updated covariance measurement. The updated state vector and covariance measurements are transformed (634) to an estimated stable space frame to produce the updated target track state information with reduced angular bias errors.

In the particular mode of the method, the step of propagating (618) the state derivative vectors may be performed by numerical integration of the state derivative vector from a prior time. The step of determining the Jacobian (620) of the state dynamics equation may include the step of determining the Jacobian of the state dynamics equation according to $$J = \left[\frac{\partial \dot{s}}{\partial s}\right] = \left[\frac{\partial \dot{s}}{\partial X_E} \quad \frac{\partial \dot{s}}{\partial \dot{X}_E} \quad \frac{\partial \dot{s}}{\partial \delta \theta}\right] = \begin{bmatrix} 0_{3\times3} & I_{3\times3} & 0_{3\times3} \\ \frac{\partial \ddot{X}_E}{\partial X_E} & \frac{\partial \ddot{X}_E}{\partial \dot{X}_E} & \frac{\partial \ddot{X}_E}{\partial \delta \theta} \\ 0_{3\times3} & 0_{3\times3} & 0_{3\times3} \end{bmatrix} \quad (10)$$

where:

$$\frac{\partial \ddot{X}_E}{\partial X_E} = -\frac{\mu}{(\hat{Z}_E \cdot \hat{Z}_E)^{\frac{3}{2}}}\left[I_{3\times3} - \frac{3}{(\hat{Z}_E \cdot \hat{Z}_E)}[\hat{Z}_E \cdot \hat{Z}_E^T]\right] - [[\hat{\omega}_E]] \cdot [[\hat{\omega}_E]]$$

-continued $$\frac{\partial \ddot{X}_E}{\partial \dot{X}_E} = -2 \cdot [[\hat{\omega}_E]]$$

$$\frac{\partial \ddot{X}_E}{\partial \delta \theta} = -\frac{\mu}{(\hat{Z}_E \cdot \hat{Z}_E)^{\frac{3}{2}}}\left[I_{3\times3} - \frac{3}{(\hat{Z}_E \cdot \hat{Z}_E)}[\hat{Z}_E \cdot \hat{Z}_E^T]\right] \cdot [[\hat{R}_E]] \cdot \hat{T}_P^E(t_i) -$$

$$2 \cdot [[\hat{\dot{X}}_E]] \cdot [[\hat{\omega}_E]] \cdot$$

$$\hat{T}_P^E(t_i) + \left[[[\hat{\omega}_E]] \cdot [[\hat{X}_E]] \cdot [[\hat{\omega}_E]] + [[\hat{\omega}_E]] \cdot [[\hat{R}_E]] \cdot [[\hat{\omega}_E]] + \right.$$

$$[[[[\hat{\omega}_E]] \cdot \hat{X}_E]] \cdot [[\hat{\omega}_E]] + [[[[\hat{\omega}_E]] \cdot \hat{R}_E]] \cdot [[\hat{\omega}_E]] -$$

$$\left. [[\hat{\omega}_E]] \cdot [[\hat{\omega}_E]] \cdot [[\hat{R}_E]]\right] \cdot \hat{T}_P^E(t_i)$$

and $$\hat{R}_E = \hat{T}_E^{\hat{E}} \cdot R_E$$

$$\hat{\omega}_E = \hat{T}_E^{\hat{E}} \cdot \omega_E$$

$$\hat{T}_E^{\hat{E}} = T_P^E(t_i) \cdot [I_{3\times3} + [[\tilde{\theta} + \delta\hat{\theta}]]] \cdot T_E^P(t_i)$$

and the [[.]] notation denotes a skew symmetric matrix of the vector argument.

What is claimed is:

1. A method for real-time target tracking and sensor angular alignment estimation and amelioration for targets having known acceleration, said method comprising the steps of:

measuring with at least one sensor at least one of (a) line-of-sight or (b) position of the target, to produce target track state measurement information for each sensor, which target track state information includes unwanted angular bias errors attributable to each sensor;

filtering said target track state measurement information with a filter to produce updated target track state information with reduced angular bias errors by correcting the target track state measurements for known alignment bias and for previously determined estimated sensor alignment biases, to thereby produce corrected measurements;

at least when corrected measurements are received, producing estimated target state derivative vectors by updating the filter time reference to the measurement time to produce propagated state derivative vectors;

determining the Jacobian of the state dynamics equation providing for observability into the sensor alignment bias through at least gravitational and coriolis forces;

from said Jacobian of the state dynamics equation, propagating the target state transition matrix and the target error covariance matrix;

if a measurement is not available, repeating said steps of producing estimated target state derivative vectors, determining the Jacobean, and propagating the target state transition and target error covariance matrices;

if a measurement is available, calculating the Kalman gain matrix using a measurement matrix and the error covariance matrix;

updating the state vector to produce an updated state vector and estimated sensor alignment biases;

updating said covariance measurement to produce an updated covariance measurement; and transforming said state vector and covariance measurements to an estimated stable space frame to produce said updated target track state information with reduced angular bias errors; and utilizing said updated target track state information as indicative of the target.

2. A method according to claim 1, wherein said step of filtering includes the step of generating estimates of said angular bias errors, and applying said estimated angular bias errors to another target tracking event.

3. A method according to claim 2, wherein said step of applying includes the step of applying said estimated angular bias errors to a subsequent target tracking event.

4. A method according to claim 1, wherein said step of propagating said state derivative vectors is performed by numerical integration of said state derivative vector from a prior time.

5. A method according to claim 1, wherein said step of determining the Jacobian of the state dynamics equation includes the step of determining the Jacobian of the state dynamics equation according to $$J = \left[\frac{\partial \dot{s}}{\partial s}\right] = \left[\frac{\partial \dot{s}}{\partial \underline{X}_{\hat{E}}} \quad \frac{\partial \dot{s}}{\partial \underline{\dot{X}}_{\hat{E}}} \quad \frac{\partial \dot{s}}{\partial \delta \underline{\theta}}\right] = \begin{bmatrix} 0_{3\times 3} & I_{3\times 3} & 0_{3\times 3} \\ \frac{\partial \ddot{X}_{\hat{E}}}{\partial \underline{X}_{\hat{E}}} & \frac{\partial \ddot{X}_{\hat{E}}}{\partial \underline{\dot{X}}_{\hat{E}}} & \frac{\partial \ddot{X}_{\hat{E}}}{\partial \delta \underline{\theta}} \\ 0_{3\times 3} & 0_{3\times 3} & 0_{3\times 3} \end{bmatrix} \quad (10)$$

where:

$$\frac{\partial \ddot{X}_{\hat{E}}}{\partial \underline{X}_{\hat{E}}} = -\frac{\mu}{(\hat{Z}_{\hat{E}} \cdot \hat{Z}_{\hat{E}})^{\frac{3}{2}}} \left[I_{3\times 3} - \frac{3}{(\hat{Z}_{\hat{E}} \cdot \hat{Z}_{\hat{E}})} [\hat{Z}_{\hat{E}} \cdot \hat{Z}_{\hat{E}}^T]\right] - [[\hat{\omega}_{\hat{E}}]] \cdot [[\hat{\omega}_{\hat{E}}]]$$

$$\frac{\partial \ddot{X}_{\hat{E}}}{\partial \underline{\dot{X}}_{\hat{E}}} = -2 \cdot [[\hat{\omega}_{\hat{E}}]]$$

$$\frac{\partial \ddot{X}_{\hat{E}}}{\partial \delta \underline{\theta}} = -\frac{\mu}{(\hat{Z}_{\hat{E}} \cdot \hat{Z}_{\hat{E}})^{\frac{3}{2}}} \left[I_{3\times 3} - \frac{3}{(\hat{Z}_{\hat{E}} \cdot \hat{Z}_{\hat{E}})} [\hat{Z}_{\hat{E}} \cdot \hat{Z}_{\hat{E}}^T]\right] \cdot [[\hat{R}_{\hat{E}}]] \cdot \hat{T}_P^{\hat{E}}(t_i) -$$

$$2 \cdot [[\hat{\dot{X}}_{\hat{E}}]] \cdot$$

$$\hat{T}_P^{\hat{E}}(t_i) + \left[[[\hat{\omega}_{\hat{E}}]] \cdot [[\hat{X}_{\hat{E}}]] \cdot [[\hat{\omega}_{\hat{E}}]] + [[\hat{\omega}_{\hat{E}}]] \cdot [[\hat{R}_{\hat{E}}]] \cdot [[\hat{\omega}_{\hat{E}}]] + \right.$$

$$\left. [[[[\hat{\omega}_{\hat{E}}]] \cdot \hat{X}_{\hat{E}}]] \cdot [[\hat{\omega}_{\hat{E}}]] + [[[[\hat{\omega}_{\hat{E}}]] \cdot \hat{R}_{\hat{E}}]] \cdot [[\hat{\omega}_{\hat{E}}]] - \right.$$

$$\left. [[\hat{\omega}_{\hat{E}}]] \cdot [[\hat{\omega}_{\hat{E}}]] \cdot [[\hat{R}_{\hat{E}}]]\right] \cdot \hat{T}_P^{\hat{E}}(t_i)$$

and $$\hat{R}_{\hat{E}} = \hat{T}_E^{\hat{E}} \cdot R_E$$

$$\hat{\omega}_{\hat{E}} = \hat{T}_E^{\hat{E}} \cdot \omega_E$$

$$\hat{T}_E^{\hat{E}} = T_P^E(t_i) \cdot [I_{3\times 3} + [[\hat{\underline{\theta}} + \delta\hat{\underline{\theta}}]]] \cdot T_E^P(t_i)$$

and [[.]] the notation denotes a skew symmetric matrix of the vector argument.

6. A method according to claim 4, wherein said step of approximating the state transition matrix used for the time propagation of the error covariance includes the approximation $$\Phi \approx I + J\Delta t + 0.5 J^2 \Delta t^2 \quad (12)$$

and also includes time propagating the error covariance matrix P with the equation $$P(t_i) = \Phi P(t_{i-1}) \Phi^T + Q_i \quad (14)$$

where Q is the state noise matrix.

7. A method according to claim 6, wherein said step of time propagating the error covariance matrix includes the step of determining the state noise matrix Q $$Q = \int_0^{\Delta t} \Phi W \Phi^T d\tau \quad (16)$$

where:

$W = E(\underline{w}(\tau)\underline{w}(\tau)^T)$; and $\underline{w}(\tau)$ is the 9×1 state noise vector of white noise.

8. A method according to claim 1, wherein said step of calculating the Kalman gain matrix using the measurement matrix and the error covariance matrix comprises the steps of calculating the Kalman gain matrix as $$K = P(t_i) \cdot H^T \cdot (H \cdot P(t_i) \cdot H^T + R)^{-1} \quad (18)$$

where:

$H = [I_{3\times 3} \ 0_{3\times 3} \ 0_{3\times 3}]$ is the measurement matrix; and R is the measurement noise covariance matrix associated with the currently reporting sensor defined in the stable space frame $$R = \hat{T}_P^E(t_i) \cdot \hat{T}_S^P(\hat{\underline{\theta}}) \cdot \Sigma \cdot \hat{T}_P^S(\hat{\underline{\theta}}) \cdot \hat{T}_E^P(t_i) \quad (20)$$

with:

Σ denoting the measurement noise matrix as represented in the sensor frame.

9. A method according to claim 1, wherein said step of transforming said state vector and covariance measurements to an estimated stable space frame includes the steps of:

$$\hat{X}_E = \hat{T}_{\hat{E}}^E \cdot \hat{X}_{\hat{E}}$$

$$\hat{\dot{X}}_E = \hat{T}_{\hat{E}}^E \cdot \hat{\dot{X}}_{\hat{E}}$$

$$P_{XX} = P_{\hat{X}\hat{X}} + [[\hat{X}_E]] \cdot \hat{T}_P^E(t_i) \cdot P_{\theta\theta} \cdot \hat{T}_E^P(t_i) \cdot [[\hat{X}_E]]^T +$$

$$\hat{T}_{\hat{E}}^E \cdot P_{\hat{X}\theta} \cdot \hat{T}_E^P(t_i) \cdot [[\hat{X}_E]]^T + [[\hat{X}_E]] \cdot \hat{T}_P^E(t_i) \cdot P_{\hat{X}\theta}^T \cdot \hat{T}_{\hat{E}}^E$$

$$P_{\dot{X}\dot{X}} = P_{\hat{\dot{X}}\hat{\dot{X}}} + [[\hat{\dot{X}}_E]] \cdot \hat{T}_P^E(t_i) \cdot P_{\theta\theta} \cdot \hat{T}_E^P(t_i) \cdot [[\hat{\dot{X}}_E]]^T +$$

$$\hat{T}_{\hat{E}}^E \cdot P_{\hat{\dot{X}}\theta} \cdot \hat{T}_E^P(t_i) \cdot [[\hat{\dot{X}}_E]]^T + [[\hat{\dot{X}}_E]] \cdot \hat{T}_P^E(t_i) \cdot P_{\hat{\dot{X}}\theta}^T \cdot \hat{T}_{\hat{E}}^E$$

where $$P(t_i) = \begin{bmatrix} P_{\hat{X}\hat{X}} & P_{\hat{X}\hat{\dot{X}}} & P_{\hat{X}\theta} \\ P_{\hat{X}\hat{\dot{X}}}^T & P_{\hat{\dot{X}}\hat{\dot{X}}} & P_{\hat{\dot{X}}\theta} \\ P_{\hat{X}\theta}^T & P_{\hat{\dot{X}}\theta}^T & P_{\theta\theta} \end{bmatrix}$$

$$\hat{T}_{\hat{E}}^E = T_P^E(t_i) \cdot [I_{3\times 3} - [[\hat{\underline{\theta}}]]] \cdot T_E^P(t_i)$$

$$\hat{\underline{\theta}} = \hat{\underline{\theta}} + \delta\hat{\underline{\theta}}.$$

* * * * *